NAMIO IWATA
KOICHI TAKAHASHI
ISAO SATO, &
SIZUYASU YANAGISAWA
INVENTORS

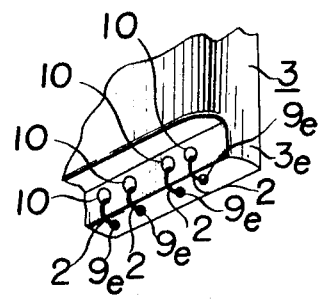
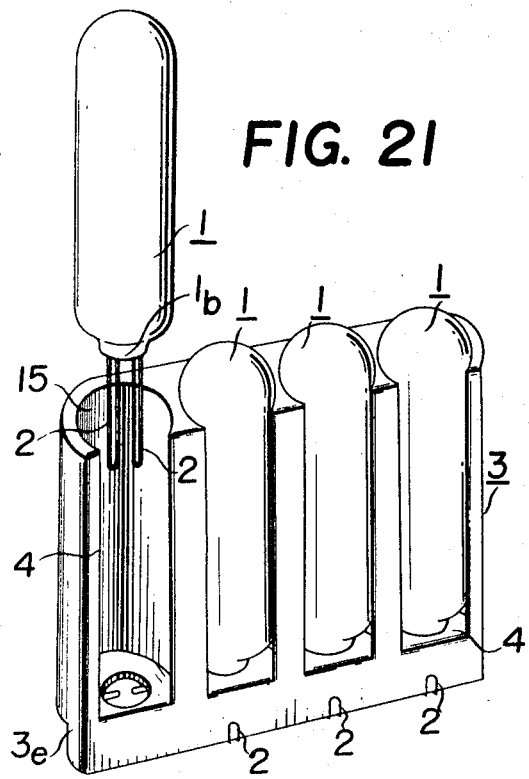
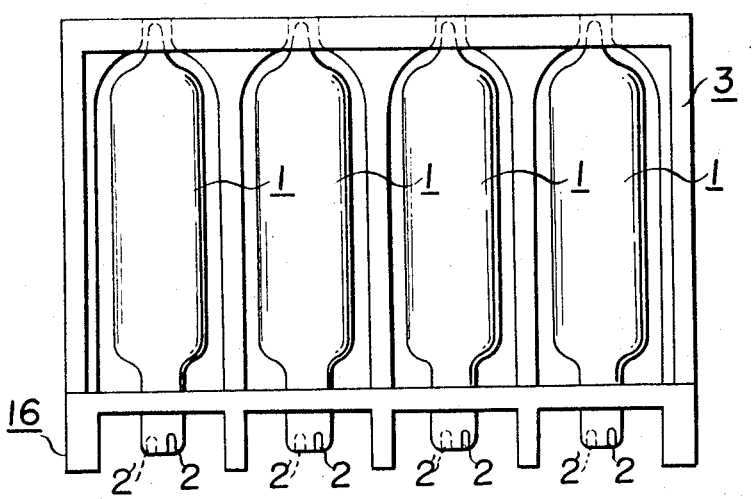

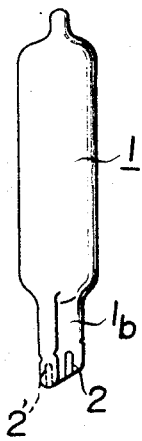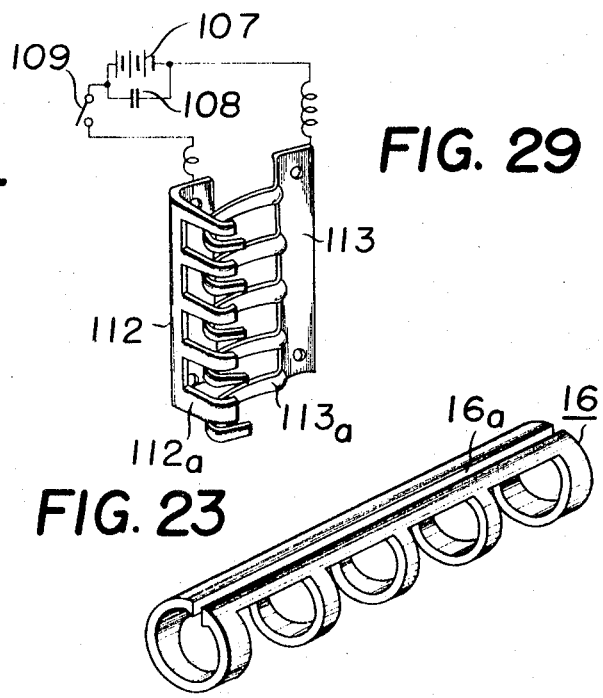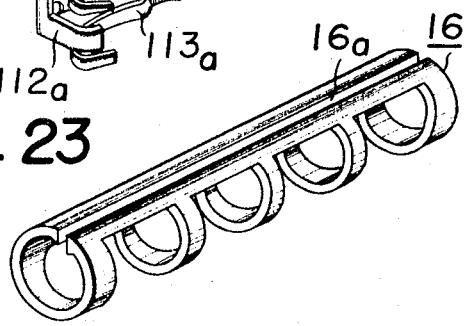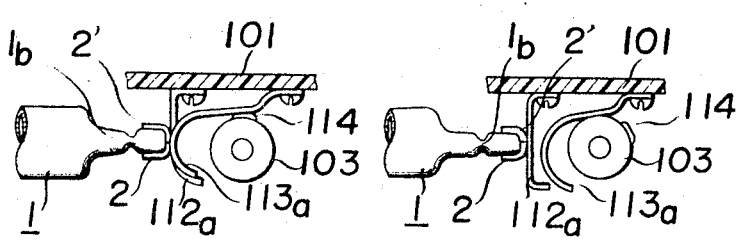

United States Patent Office 3,454,756
Patented July 8, 1969

3,454,756
FLASH BULB MAGAZINE
Namio Iwata, Odawara-shi, Koichi Takahashi, Tokyo, Isao Sato, Kawasaki-shi, and Sizuyasu Yanagisawa, Tokyo, Japan, assignors, by mesne assignments, to Tokyo Shibaura Electric Co., Ltd., and Canon Camera Co., Inc., Kawasaki-shi, Tokyo, Japan, respectively, both corporations of Japan
Filed July 14, 1966, Ser. No. 565,225
Claims priority, application Japan, July 19, 1965, 40/58,823; July 20, 1965, 40/59,122; Aug. 5, 1965, 40/63,890; Aug. 24, 1965, 40/69,056; Sept. 15, 1965, 40/75,081; Sept. 17, 1965, 40/75,713, 40/75,714; Dec. 25, 1965, 40/105,554
Int. Cl. G03b 15/02; F21v 19/04
U.S. Cl. 240—1.3                                    8 Claims

ABSTRACT OF THE DISCLOSURE

The base portion of a flash bulb magazine includes a linear projection having a plurality of openings therein, the lead-in wires of the flash bulbs being bent around the projection and retained in respective openings after being passed through the base portion. The bent around portions of the lead-in wires are electrically coupled to an energizing device for successively energizing the flash bulbs. One preferred energizing device is a rotatable drum having pairs of contacts for contacting the bent around portion of each bulb at different stages of rotation of the drum. A second preferred energizing device includes a pair of spring contacts associated with each bulb and a rotatable drum having projections which actuate the pairs of spring contacts at different stages of rotation thereof.

---

This invention relates to apparatus for use in successive flashlight photographing and relates more particularly to a flash bulb magazine.

Cameras developed in recent years have such an arrangement that shutters can be reset cooperatively with the film winding operation to be ready for the succeeding shot immediately after the previous photographing. Light flashing devices applicable to such cameras, however, have not been satisfactorily developed. In particular, a magazine for use with a light flashing device for successive photographing and which comprises a unitary structure of flasher bulbs and reflectors has not yet been proposed.

Among known techniques, there has been proposed a magazine for use with a light flashing device wherein a plurality of flash bulbs are used. In such a magazine, flash bulbs are transferred and supplied only one by one to a place directly in front of the reflector of a light flashing device, thus rendering the construction of the holder means and flasher device of flash bulbs extremely complicated and unsuitable for practical utilization.

It is an object of this invention to provide a magazine of a simple construction capable of simply switching on the contacts between flash bulbs and the associated energizing means, and which can be manufactured at low costs.

It is another object of this invention to provide a removable flash bulb magazine for use with a light flashing device or with a camera operable in rapid succession and having means to positively receive the removable magazine and means for successively energizing flash bulbs carried by said holder, a plurality of flash bulbs mounted in said body frame in a row, optical reflectors disposed on said body frame respectively at the back of the corresponding flash bulbs, the optical axes of said optical reflectors being parallel to one another and normal to the row of said flash bulbs, and pairs of lead-in wires each extending from each of said flash bulbs with a spacing therebetween.

Other objects and advantages of the invention will become apparent from the following description taken in connection with the acompanying drawings in which:

FIG. 20 is a partial perspective view of the rear bottom portion of the magazine shown in FIG. 19;

FIG. 21 is a perspective view of the magazine shown in FIG. 19 wherein the arrangement of lead-in wires is modified;

FIG. 22 is a front view of a modification of the magazine;

FIG. 23 is a perspective view of the holder means shown in FIG. 22;

FIG. 24 is a perspective view of flash bulbs to be mounted on the holder means shown in FIG. 23;

FIG. 29 is a schematic perspective view of contact members of the light flashing device shown in FIG. 28;

Figure 31:
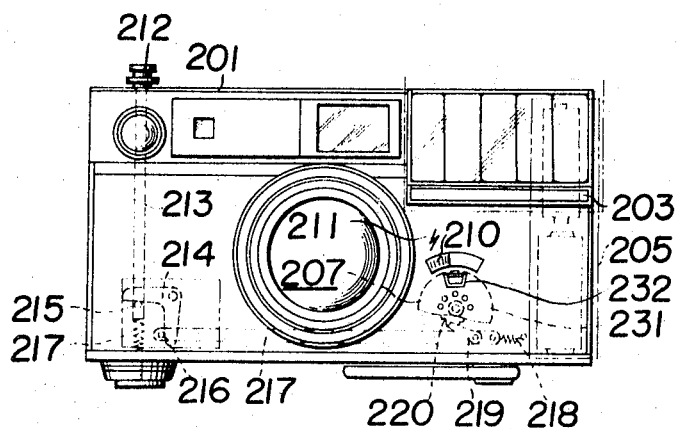
Figure 32:
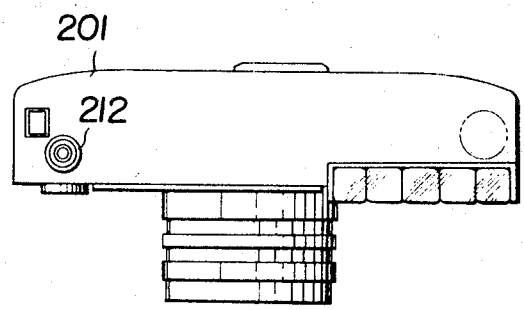
Figure 33:
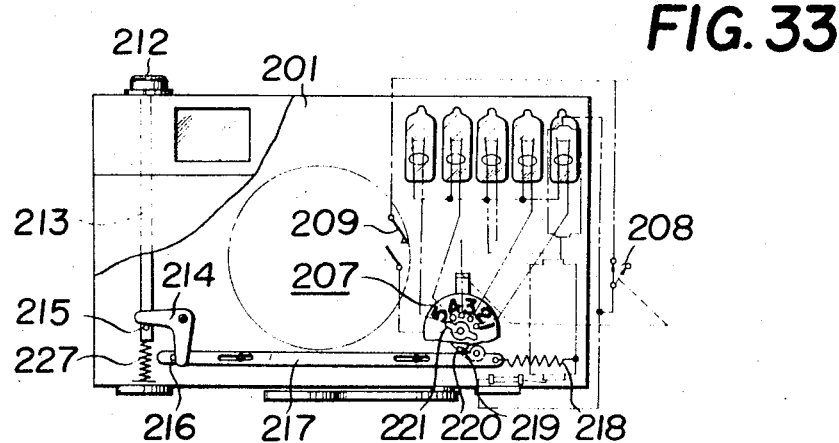
Figure 34:
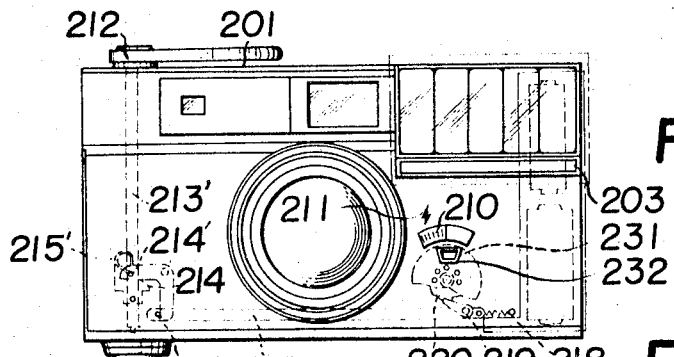
Figure 36:
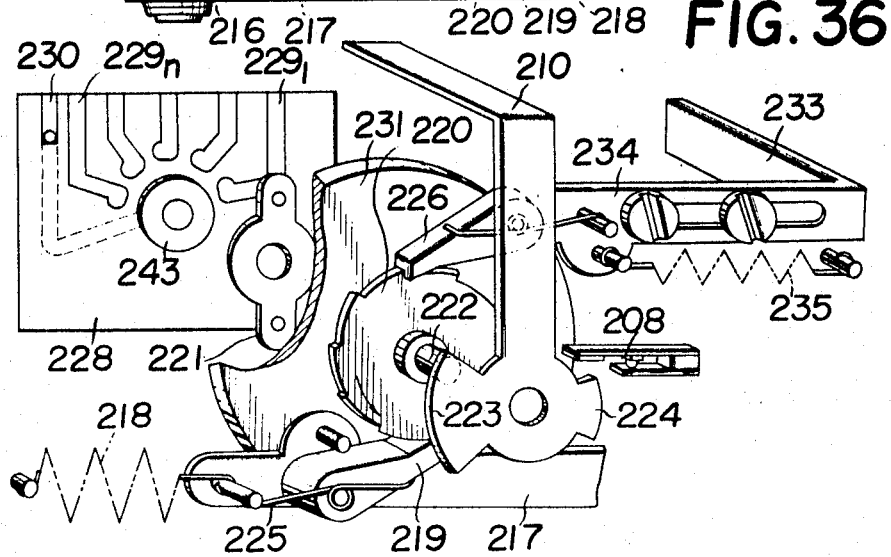
Figure 35:
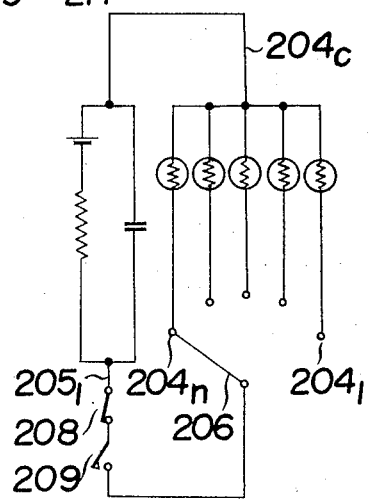
Figure 37:
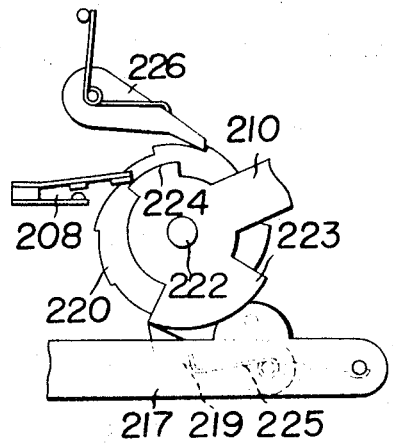
Figure 38:
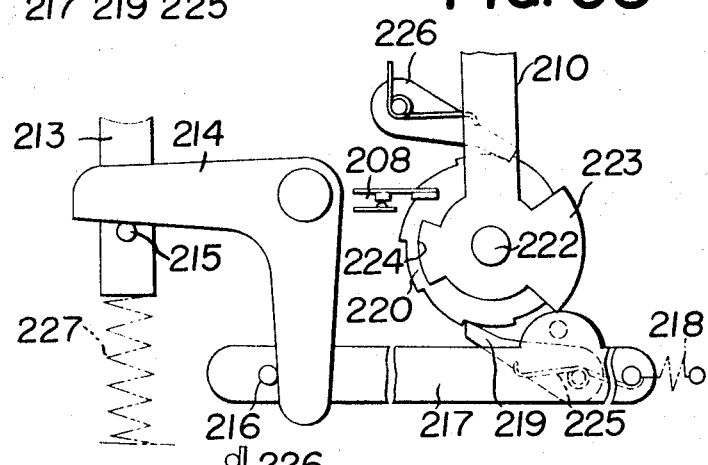
Figure 39:
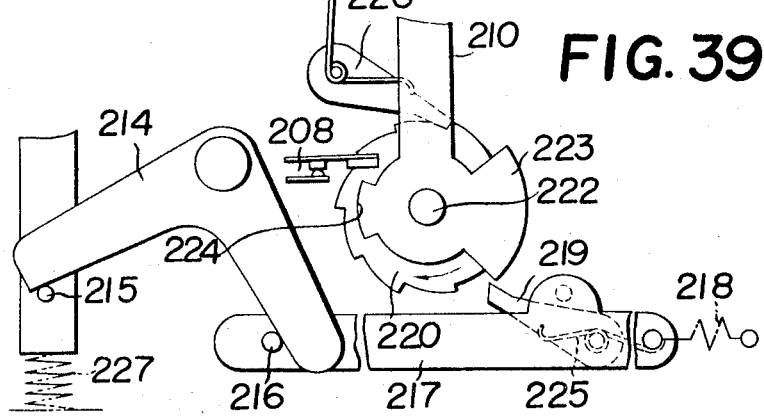
Figure 40:
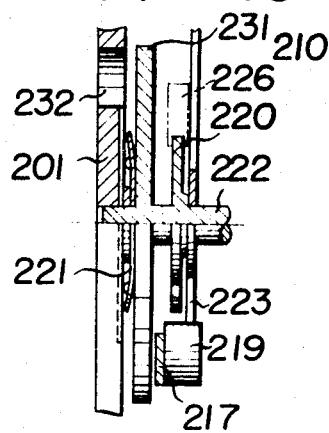
Figure 41:
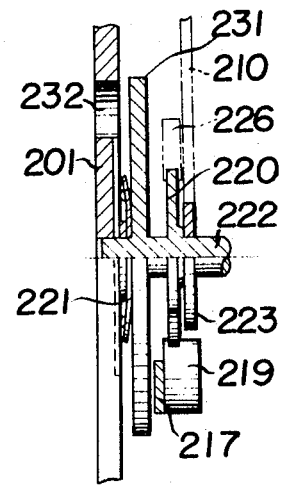

FIGS. 30A and B are partially enlarged views showing the construction as well as function of the contact members with respect to projections formed on a drum;

FIG. 31 is a front view of a camera equipped with the magazine embodying this invention;

FIG. 32 is a plan view of the camera shown in FIG. 31;

FIG. 33 is an outlined arrangement of respective components applicable to the magazine of this invention;

FIG. 34 is an elevation of another example of the camera applicable to the magazine of this invention;

FIG. 35 is a circuit diagram of the system applicable to this invention;

FIG. 36 is an enlarged view of a contact change-over mechanism of a flash bulb circuit, viewed from the back side of the camera;

FIGS. 37 to 39 are views illustrating the function of the change-over mechanism shown in FIG. 36; and FIGS. 40 and 41 are side views of the mechanisms shown in FIGS. 37 and 38, respectively.

Figure 1:
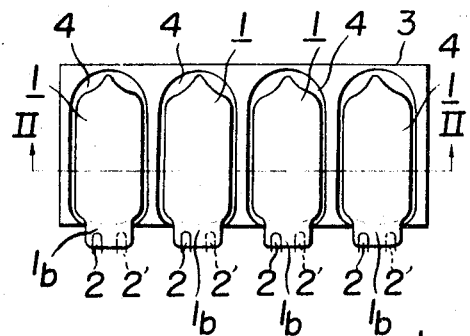
FIG. 1 shows a front elevational view of a magazine embodying this invention.
Figure 2:
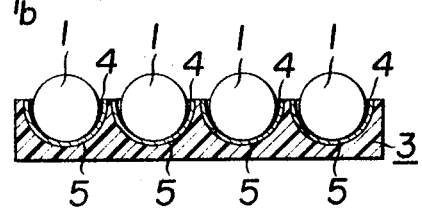
FIG. 2 is a cross sectional view taken on the line II—II in FIG. 1.

Referring to the accompanying drawings wherein corresponding portions are designated by the same reference numerals, and particularly to FIGS. 1 and 2, the reference numeral 1 designates a plurality of baseless type flash bulbs each having a sealed stem portion through which lead-in wires 2, 2', extend into the interior of the flash bulb. The flash bulbs 1 are disposed at equal spacings and in one row, in a body frame 3 preferably made of synthetic resinous material. The body frame 3 is provided with hollows 4 of the number corresponding to that of said bulbs 1 to support or receive the bulbs, said hollows being formed in the front side of the body frame 3 and having a semicircular cross section. To serve as a reflector the concave surface of each of the hollows 4 is polish-finished or, as shown in the figures, may be vapor deposited with metallic material, such as aluminum thereby improving the reflection effect thereof. In this case, the optical axis of each hollow acting as an optical reflector is arranged normal to a lateral alignment of the bulbs and hence extends in a direction perpendicular to the front side surface of the body.

The lead-in wires 2 and 2' are bent into the form of an inverted U-shaped configuration along the opposite sides of the press of each flash bulb and adapted to be electrically connected to the contact portions of a successive flashing type flashing device to be described later in detail.

The support of the flash bulbs by the hollows formed in the body frame 3 may be achieved either by placing the bulbs in engagement with the concave surfaces of the respective hollows before layers of metallic material to be deposited on said surfaces to form reflector surfaces are solidified, or by connecting the bulbs to said surfaces by means of a suitable binding agent.

Figure 3:
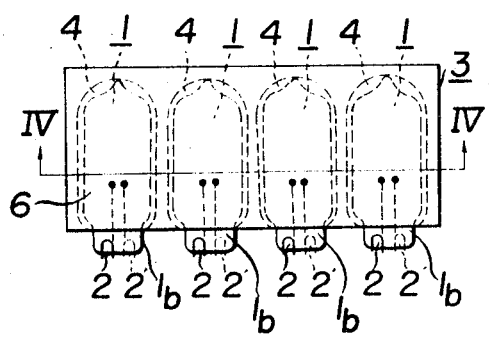
FIG. 3 is a front elevation illustrating a modification of the magazine.
Figure 4:
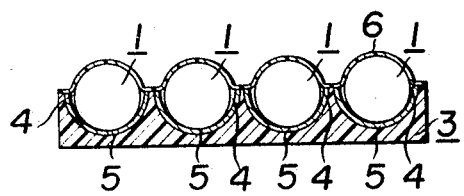
FIG. 4 is a cross section taken on the line IV—IV in FIG. 3.

According to a modification shown in FIGS. 3 and 4, the front side of the body is coated with a transparent cover sheet 6 of synthetic resin or the like material. This cover sheet functions as a protector means to prevent the bulbs from being broken and scattered at the time of flashing, and may also function to hold the bulbs in position in the hollows 4. For the purpose of color photographing the cover sheet may be colored to correspond to an illumination color for colored photographs or to meet other special applications in color flashlight photography.

Figure 5:
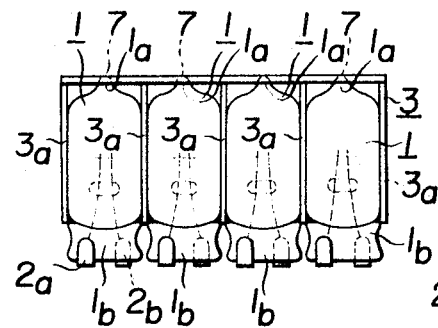
FIG. 5 is a front elevation of a further modification of the magazine.
Figure 6:
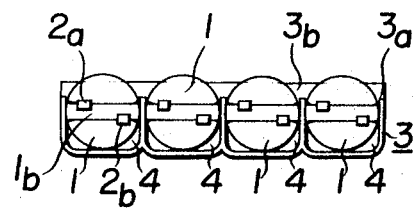
FIG. 6 is a bottom view of the magazine shown in FIG. 5.
Figure 7:
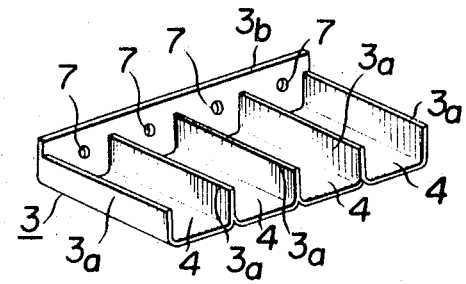
FIG. 7 is a perspective view of the magazine shown in FIG. 5.

In FIGS. 5 to 7 inclusive, the body frame 3 is shown to be box-like which is divided with partition walls 3a to define hollows 4 and provided with a supporting wall 3b common to one end of each of the hollows. Small openings 7 are perforated in said supporting wall so as to associate with the respective hollows. The tip 1a of each flash bulb 1 is inserted in the corresponding opening 7 so as to render the positioning of each bulb in the hollow stable. In the illustrated modification, a series of bulbs are so arranged that the presses 1b thereof may equally extend outwardly from the body frame at the side opposite to said supporting wall 3b with the ends of said presses laterally aligned. Contact members 2a and 2b connected to the lead-in wires 2, 2' are provided on the opposite sides of the press of each bulb. The inner surfaces 4 defined by walls 3a of the body frame and the partition walls act as reflectors as in the previous embodiments.

Figure 8:
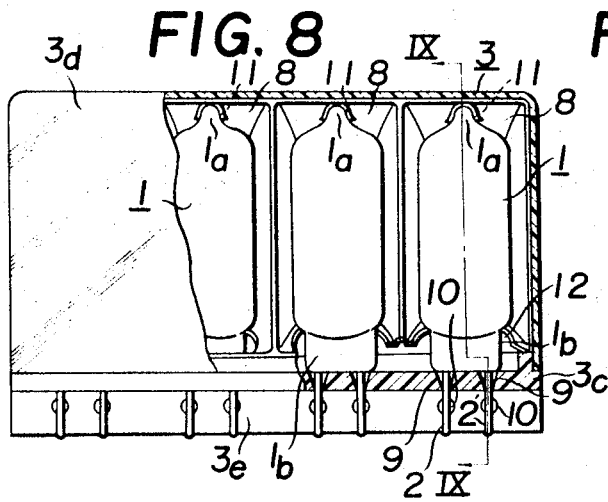
FIG. 8 is a front elevation, partly broken away, of a modification of the magazine which has a reduced weight and in which the reflectors and body frame are constructed separately.
Figure 9:
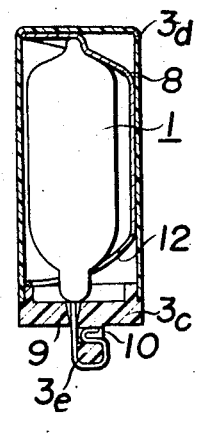
FIG. 9 is a cross section taken on the line IX—IX in FIG. 8.
Figure 10:
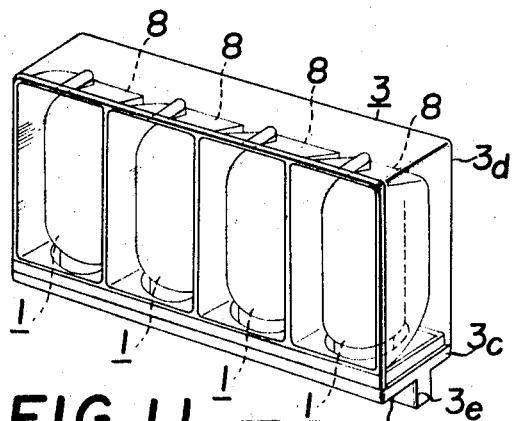
FIG. 10 is a perspective view of the magazine shown in FIG. 8.

In a further modification shown in FIGS. 8 to 10, the body 3 consists of a thin rectangular base 3c made of an insulating material, such as synthetic resin or the like, and a transparent cover 3d fitted to the ridge portion of the base 3c and which is formed of synthetic resinous material. Within said cover 3d are mounted bowl-like reflectors 8 which are made of aluminum sheet and are respectively secured on the base 3c laterally in a row, the open side of each bowl-like reflector 8 being directed outwardly perpendicular to the line of the row. In each reflector 8 is mounted a flash bulb 1 with its tip end received by a groove 11 formed at the upper wall portion of the reflector. To support the lead-in wires 2, 2' the base 3c is provided with a linear projection 3e integrally formed on the bottom surface thereof and extending along its entire length. Pairs of vertical holes 9 are also formed in the base in such a manner that they are in substantial alignment with the front side surface of said linear projection 3e and that each pair of the holes 9 may correspond to each reflector 8. The projection 3e is provided with a plurality of retention holes 10 which are laterally perforated therein to correspond with the respective holes 9, so that the lead-in wires extend through the respective holes 9 and about the projections and may be inserted in the retention holes 10 to be held thereby, as best shown in FIG. 9. With this arrangement wherein the base and the cover are assembled together to constitute the body frame, it is not only possible to avoid the danger of explosion of the bulbs at the time of flashing, but also to reduce the overall weight of the magazine. For the purpose of simplifying the placement of the bulbs within the cover at the time of assembling, an opening 12 through which the bulb is sufficiently inserted from the side of the base is formed in the lower wall of each reflector 8.

Figure 11:
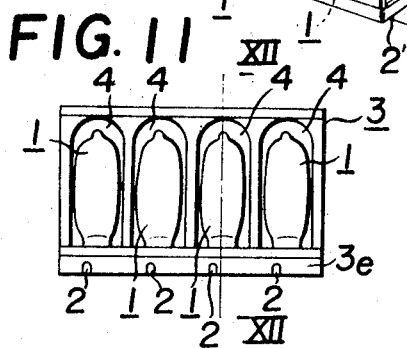
FIG. 11 is a front elevation of a still further modification of the magazine.
Figure 12:
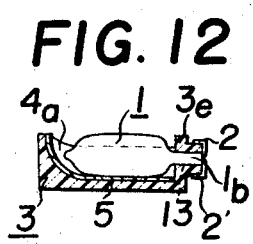
FIG. 12 is a cross section taken on the line XII—XII in FIG. 11.

In a modification shown in FIGS. 11 and 12, the projection 3e is integrally formed with the body frame 3 and the concave surfaces of recess portions 4 formed in the body frame 3 serve as reflectors. In this modification, an opening 13 penetrates from each hollow and through the projecting portion 3e. The stem press 1b of each bulb is fitted into said opening 13 and thereby stably positioned in the hollow 4. Each of the openings 13 also functions to lead a pair of lead-in wires 2 to 2' to the outside. The ends of the lead-in wires thus led are bent along opposite sides of the projection 3e. In this case, it will be necessary to provide enough space at a portion remote from the opening 13 in order to smoothly insert the bulb into said opening 13.

Figure 13:
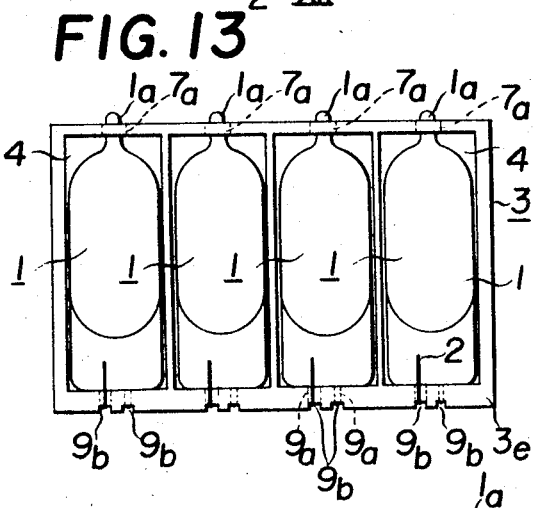
FIG. 13 is a front view of a modification of the flash bulb holder means associated with the magazine body.
Figure 14:
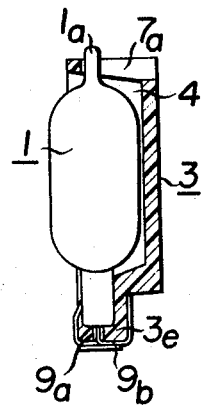
FIG. 14 is a side view of the holder means shown in FIG. 13.
Figure 15:
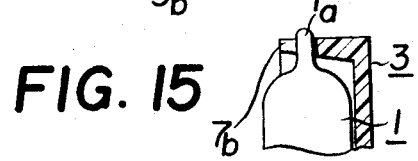
FIG. 15 is a partial front view of a modification of the holder means shown in FIG. 13.

In a modification shown in FIGS. 13 and 14, the body frame 3 comprises guide slits 7a formed in the upper wall thereof. The guide slits 7a are adapted to guide the tip 1a of the bulb 1 at the time of assembling and also to support the tip after assembling. The bottom portion 3e of the body 3 has pairs of holes 9a communicating with the respective concave portions 4 formed in the body frame. The holes 9a communicate with corresponding grooves 9b formed in the outer surface of the bottom portion 3e of the body frame. Each pair of lead-in wires 2 and 2' contacting with the respective flash bulbs extend through said holes 9a and grooves 9b and bent along opposite sides of said portion 3e, so that one of a pair of the lead-in wires may lie along the front side of the projection 3e and the other may lie along the rear side thereof. It will be understood that the guide slits 7a may be cut as at 7b from the front side of the upper wall of the body, as shown in FIG. 15.

Figure 16:
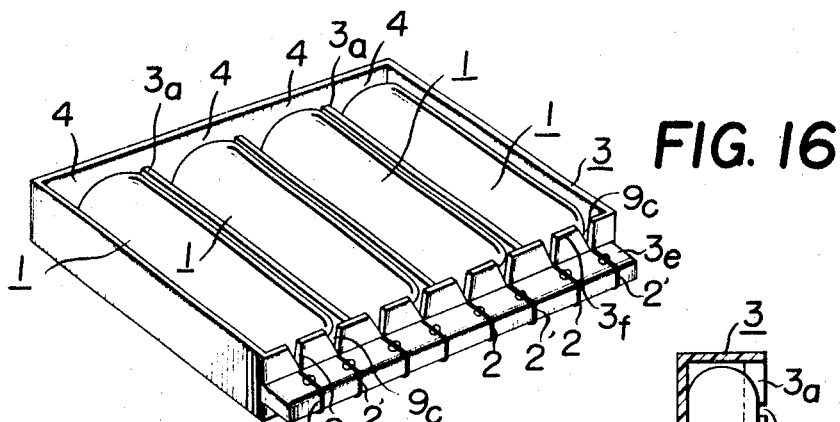
FIG. 16 is a perspective view of a modification of the magazine.
Figure 17:
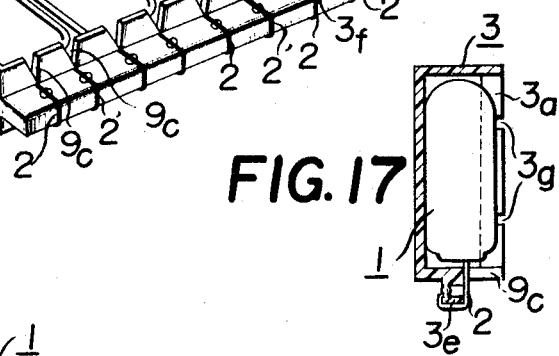
FIG. 17 is a vertical cross section of a modification of the flash bulb holder means.
Figure 18:
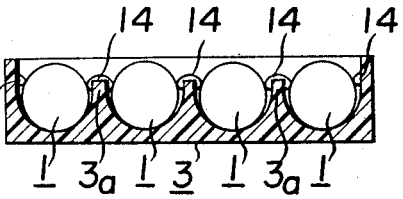
FIG. 18 is a transversal cross section of the holder means shown in FIG. 17.

In a still further modification shown in FIG. 16, in order to lead lead-in wires 2 and 2' from hollows 4 to the surface of a projection 3e, pairs of V-shaped grooves 9c are cut in the lower edge 3f of the body frame 3. The projection 3e is provided with a plurality of retention holes 10 which are laterally perforated to correspond with the respective grooves 9c, so that the lead-in wires may be extended through the respective grooves and be wound round the projections. The wires may also be inserted in the retention holes 10 to be held as shown in FIGS. 8 and 9. Partition walls 3a by which the inner space of the body frame is divided to form the hollows 4 are made slightly lower than the edge portions of the body frame 3. The support of the flash bulbs may be effected in any of the manners already described hereinbefore, or alternatively as shown in FIGS. 17 and 18. For example, each partition wall 3a has indented portions 3g to which pieces 14 made of say synthetic resinous material are fitted, thereby preventing the flash bulbs from falling off. Preferably these pieces 14 are welded to the partition walls. Since in this arrangement the lead-in wires 2, 2' are extended through the V-shaped grooves 9c, instead of through the holes in the first-mentioned embodiment, a plurality of flash bulbs may be attached to the hollows 4 at the same time. As a result, the arrangement of this embodiment may easily be actuated.

Figure 19:
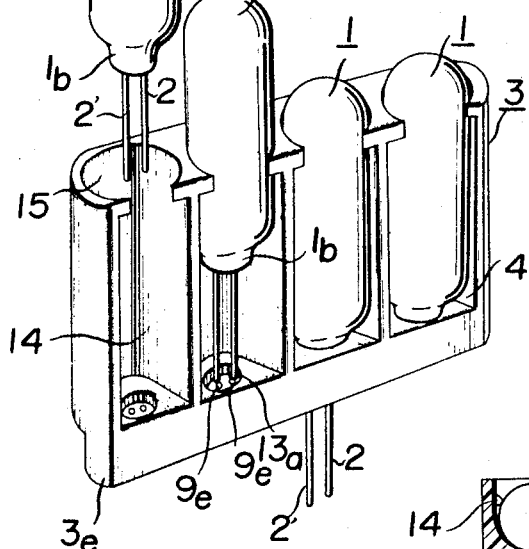
FIG. 19 is a perspective view of a modification of the magazine suited for the insertion of flash bulbs into hollows formed therein.

FIGS. 19 and 20 show the construction of a modification of the body 3 for more quickly mounting flash bulbs onto the body in the manufacture of the magazine. As shown, each hollow 4 formed in the body and open at the front side thereof has a recess 13 formed in the lower portion of the body to snugly receive the press 1b of the flash bulb 1. The bottom of each of said recesses 13a are perforated with a pair of small bores 9e to emerge immediately adjacent the bottom projection 3e provided on the bottom surface of the body frame. Each hollow 4 has, at its end opposite to the portion where the recesses are provided, a substantially circular opening 15 through which the flash bulb 1 may be adequately inserted. When the bulbs are inserted into the hollows through the respective openings 15, lead-in wires may pass through the bores 9e and extend downwardly from the lower end of the projection 3e of the body frame, so that the guide and insertion of the lead-in wires through the bores can be effected simultaneously with the insertion of the bulbs through the respective openings 15, thus omitting one of the manufacturing steps. The lead-in wires thus extending from the body may be treated in the manner described above or, as shown in FIG. 20, passed around the projecting portion 3e and connected at their ends to connection bores 10 formed in said projecting portion 3e. Each of the bulbs is supportedly held by the concave surface except its open front side. As shown in FIG. 21, the lead-in wires may take the form of a loop at their forward ends to have a construction of double-wire lead. In this case, the wire may be sufficiently held in place only by bending it along the surfaces of the projection of the body frame and at opposite sides thereof.

In a modification shown in FIGS. 22 to 24, flash bulbs 1 are supported by a holding means 16 of synthetic resin molded into the form of a rib, and, under that state, mounted in the hollows of the body frame 3. Said holding means 16 has a slit 16a whose spacing is adjustable by virtue of the resiliency of the holding means which grips the stems of the flash bulbs therebetween so that the bulbs may be mounted thereon in one row. The lead-in wires 2 and 2' are bent along the opposite sides of the stem press of the bulbs and are so positioned that they come to appear at the portions cut in the rib-like holding means 16.

Figure 25:
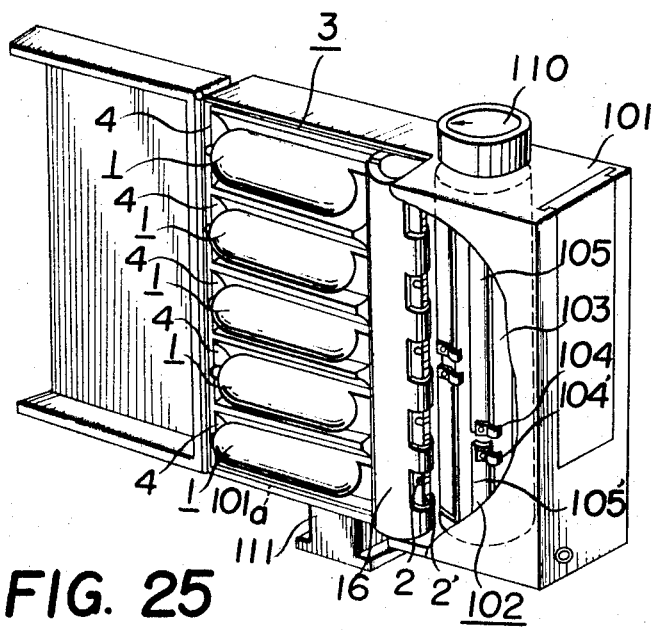
FIG. 25 is a perspective view of a light flashing device as using the magazine shown in FIGS. 22 to 24.
Figure 26:
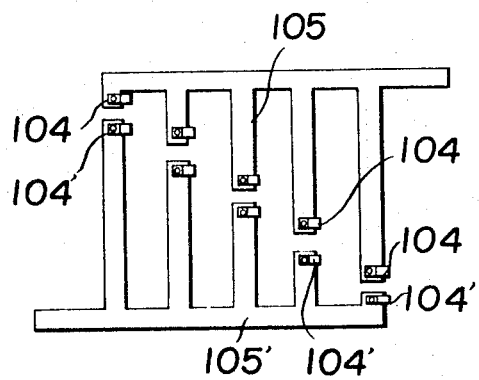
FIG. 26 is a schematic view of segments used for the light flashing device shown in FIG. 25.
Figure 27:
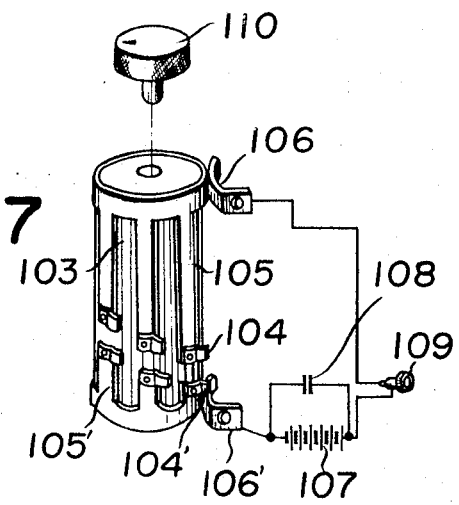
FIG. 27 is a schematic perspective view illustrating means to successively energize the flash bulbs.
Figure 28:
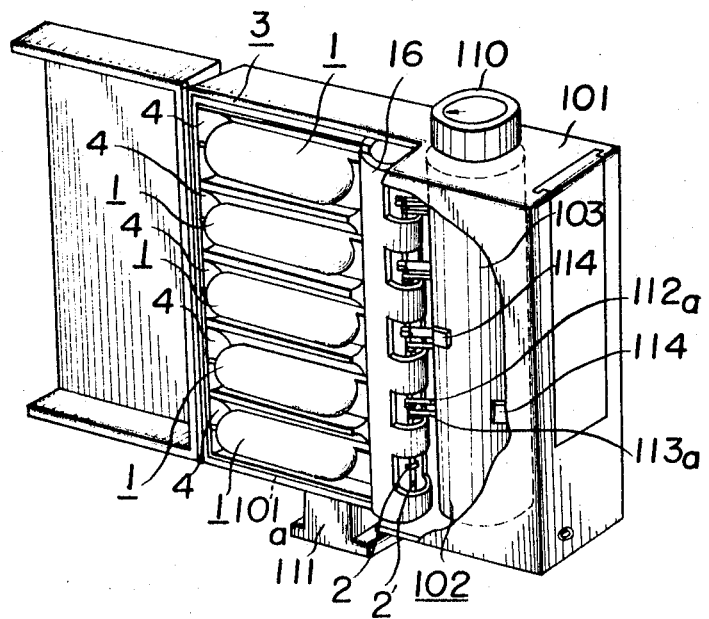
FIG. 28 is a perspective view of another example of the light flashing device.

The invention will now be described in connection with a light flashing device for successive flashing wherein a magazine of the type shown in FIG. 22 to FIG. 24 is employed. In the light flashing device shown in FIG. 25, a casing 101 comprises a magazine housing portion 101a capable of removably carrying the body frame 3 or magazine, and means provided adjacent said housing portion 101a and adapted to successively energize flash bulbs loaded in the body frame. Said means 102 comprises a rotary drum 103 axially mounted in the casing 101 in parallel relationship with the holding means 16 attached to the body frame 3 carried by the housing portion 101a. On the outer surface of the drum 103 are secured pairs of contact elements 104 and 104' which are spaced each from the other with respect to the direction of outer circumference of the drum so as to be operable at different stage, as shown in FIGS. 26 and 27 and which respectively correspond to each pair of the lead-in wires 2 and 2' of the flash bulbs. These contact elements 104 and 104' are respectively mounted on common segments 105 and 105'. Said segments 105 and 105' are secured on the surface of the drum 103 so that they may respectively surround, at their ends, the circumferential ends of the drum to form annular ring portions. These annular ring portions slidably engage contact brushes 106 and 106' mounted within the casing 101 and which are connected to a source of electric power 107. A condenser 108 is connected across said power source 107, and between the power source and one of the contact brushes is serially connected a switch 109 which is operable in synchronism with a camera shutter not shown. In FIG. 27, 110 indicates a knob rigidly secured to the axis of the drum 103 and positioned outside the casing 101 in order to rotate the drum, and 111 designates a stand for supporting the light flashing device to a camera.

When the drum is rotated clockwise by means of the knob 110, the contact points between each pair of the contact elements 104 and 104' and each pair of the lead-in wires of the flash bulbs change successively from the upper to the lower stages. Thus, a rapid successive switching of the bulbs to a condition ready for flashing may be effected simply by the rotating operation of the knob 110 so that the flash bulb may be lit in synchronism with the operation of the camera shutter.

In the foregoing example, the knob 110 is adapted to operate independently of the film winding means. But if these elements are combined to work in cooperation with each other, more rapid successive flashlight photographing will become possible.

In FIGS. 28 to 30A and B illustrating another embodiment of the light flashing device, comb-shaped contact members 112 and 113 are secured on the inner wall of the casing 101 in spaced-apart relationship with each other and positioned between the drum 103 and the presses 1b of the bulbs.

Comb teeth 112a and 113a of the contact members 112 and 113 respectively correspond to the lead-in wires 2 and 2' lying about the respective presses 1b, said comb teeth 112a contacting the respective lead-in wires 2 and said comb teeth 113a confronting to the lead-in wires 2' with a space therebetween. The contact plates 112 and 113 are connected to a power source 107 across which a condenser is connected, similarly as the segments 105 and 105' in the previous embodiment, and a switch 109 is serially connected between the power source and one of the contact plates 112 and 113. On the surface of the drum 103 are provided projections 114 equally spaced each from the other both in the lateral and circumferential directions to operate at different stage and which function to successively press the rear surfaces of the corresponding comb teeth 113a upon rotation of the drum 103 by means of a knob 110, whereby each of the comb teeth 113a is bent and rendered from the state shown in FIG. 30A to that shown in FIG. 30B to contact with the lead-in wire 2'. Similarly as in the previous embodiment it is possible to successively and rapidly set the flash bulbs ready for flashing in synchronism with the switching of the shutter by a simple operation of rotating the knob 110. The comb teeth may be preferably made of flexible steel strips.

The invention will also be described in connection with a camera having means for successive flashing. In the camera shown in FIGS. 31 to 41, the magazine body 3 in which a plurality of flash bulbs $1_1$, $1_2$ ... $1_n$ are arranged is used. Lead-in wires of said flash bulbs are respectively connected with terminal contacts $204_1$, $204_2$ ... $204_n$ in a mouth piece 203 and lead-in wires $2'_1$, $2'_2$ ... $2'_n$ connected with a terminal contact 204c in said mouth piece. A power supply unit 205 consists of a battery B$a$, a condenser C and an adjusting resistor R. The mouth piece 203 and the power unit 205 are built in proper position in the camera body. As shown in FIGS. 33 and 34, a changing piece 206 for terminal contacts $204_1$ to $204_n$ corresponding to flash bulbs $1_1, 1_2 \ldots 1_n$, the power supply unit 205, a switch 208 and a camera turning contact 209, are all arranged in the camera. When the changing lever 210 for ordinary and flash photographings which is located in a proper position in the camera body is set at a flash photographing symbol 211 as shown in FIG. 31, the power switch 208 is closed and a contact change-over mechanism 207 of the flash lamp electrical circuit is ready for operation.

The change-over mechanism 207 comprises an automatic device interlocking with a release mechanism and a manual device using a part of the automatic device. When a release button 212, in FIGS. 31 to 33, is pushed, a two-way lever 214 which has been suspended by a pin 215 of a shaft 213 of the release button starts rotation by means of a spring 218. Meanwhile, a sliding lever 217 connected by pin 216 to the two-way lever 214 shifts toward the right (in FIGS. 31 to 33), and at the same time a ratchet feed pawl 219 fitted to a sliding lever 217 moves back toward the right. When the release button 212 is reset by a spring 227, the parts 214 to 219 return to their original positions. If the lever 210 is set for ordinary photographing, the parts 214 to 219 are in lost motion because the feed pawl 219 does not affect a ratchet wheel 220. But if the lever 210 is set for flash photographing, the feed pawl 219 is reset toward the left, with the result that the ratchet wheel 220 is rotated at a predetermined angle by means of the feed pawl 219, and that a change-over plate 221, or a changing piece, is acutated for selection of contacts $204_1$ to $204_n$ corresponding to flash lamps $1_1$ to $1_n$ at every time of releasing.

Flash ignition is effected while the feed pawl 219, etc. is shifted toward the right by means of a turning contact 209, via a switch 208 (closed when the lever 210 is set for flash photographing), turning contact 209, changing piece 206, either one of terminal contacts $204_1$ to $204_n$, either one of flash lamps $1_1$ to $1_n$, common terminal $204c$ and power supply unit 205.

After closing of the preceding electrical circuit, a new flash lamp circuit will be closed interlocking with the next releasing operation.

The change-over mechanism 207, as illustrated in FIG. 34, consists of an automated device interlocking with the film winding mechanism, and a manual device employing a part of the automatic device. In FIG. 34, when the film feed lever 212' is actuated for feeding the film, a circular cam 215' fixed on a shaft 213' of the lever rotates. Then a pin 214' set on the two-way lever to the cam slides and moves up or down along the cam.

Namely, rotation of a feed lever 212' lets the circular cam 215' push the pin 214' upward, resulting in rotation of the two-way lever 214 in the clockwise direction. Then the sliding lever 217 always pressurized on the two-way lever 214 by the pin 216 by a spring 218 slides toward the left, and the ratchet wheel 220 is rotated at a predetermined angle by means of the feed pawl 219 fixed on the sliding lever 217. Thus a change-over plate 221, or changing piece, selects one after another electrical contacts $204_1$ to $204_n$ corresponding to flash lamp $1_1$ to $1_n$.

When the feed lever completes film feeding and return to its original position, the feed pawl 219 does not act on the ratchet wheel 220 but the parts 214–219 return in positions.

To show an example of the structure of the contact change-over mechanism 207 in the flash lamp electrical circuit in detail, the changing lever 210 is connected to a shaft 222 on which the ratchet wheel 220 and change-over plate 221 are mounted, as shown in FIG. 36 and its followings. When the lever 210 is set for ordinary photographing, a projection 223 interlocking with the lever 210 forces down the feed pawl 219 against the spring 225 to disengage the mesh of the pawl with the ratchet wheel 220.

Then a projection 224 opens the power switch 208. Thus neither the change-over mechanism nor flash lamp are actuated through the sliding lever 217 makes reciprocating motions every time of releasing. Element 226 is the check pawl of the ratchet wheel 220. (See FIGS. 37 and 40.)

When the change-over lever 210 is set for flash photographing, the projections 223 and 224 escape. Thus the feed pawl 219 engages with the ratchet wheel 220, and the power switch 208 is closed. (See FIGS. 36, 37 and 38.) In releasing, the sliding lever 217 shifts rightward by means of the spring 218, i.e., from the condition shown in FIG. 37 to that in FIG. 39. When the release push button 212 is released, it is reset by a spring 227 and at the same time both the ratchet wheel 220 and change-over plate 221 rotate at a definite angle.

Element 228 is the change-over terminal board. Contacts $229_1$ to $229_n$ corresponding to flash lamps $1_1$ to $1_n$ are arranged about a circular electric conductor 243. Element 228 is mounted to a shaft 222. A contact 230 connected to the power supply unit is coupled to the plate 221 via an electric conductor 243.

A dial plate 231 is fixed on the shaft 222, and the number showing the sequence of flash lamps carved to the face of the dial can be read through a window 232 shown in FIG. 31.

In flash photographing, the flash lamps are all used on a continuous basis but sometimes some of them are selected and used.

In some latter cases, it will be more convenient to select any desired lamp or lamps manually. To meet such requirement, a check pawl 226 of the ratchet wheel 220, as shown in FIG. 36, is designed either to be integral with a manual change-over handle 233 or to be mounted on a sliding plate 234 which interlocks with the pawl. Thus when the handle 233 is operated, both the sliding plate 234 and pawl 226 move forward against a return spring 235 and as a result, the ratchet wheel 220 is rotated at a predetermined angle as in the case of automatic change-over operation. Since the flash bulb magazine according to this invention holds a plurality of flash bulbs in a row along the longitudinal axis of the magazine, the magazine is compact and of a flat configuration. Consequently, it is suitable for carrying about since it may be easily accommodated in a pocket of a suit for example.

The magazine has reflectors corresponding to each of the flash bulbs, their optical axes being parallel to one ane other and normal to the row of the flash bulbs. Thus, two or more flash bulbs may be flashed at a time, where desired. Furthermore, in the magazine according to the invention, as soon as the linear projection of the magazine is attached to the flashing means, the contacts constituted by the lead-in wires of the flash bulbs are electrically connected to the energizing means of the flashing means, whereby a rapid use of the flash magazine may be obtained without the accessory shoe which is required for the prior art devices.

It will be understood that particular embodiments of the invention described herein are intended as illustrative examples of the invention and that the invention is not necessarily limited to such embodiments.

It will be also apparent that many other modifications of the invention described hereinbefore may be made. It is to be understood, therefore, that the appended claims are intended to cover all such modifications that fall within the true spirit and scope of the invention.

What is claimed is:

1. A removable flash bulb magazine device for use with a plurality of flash bulbs, each bulb having at least one leadin wire, comprising:

energizing means in said magazine for successively energizing said flash bulbs;

an elongated base portion having a plurality of separated receiving means therein which are adapted to receive said flash bulb lead-in wires, said plurality of receiving means being arranged in a row along the longitudinal axis of said elongated base;

a linear projection disposed on the bottom surface of said base portion for coupling to said energizing means, said linear projection having a plurality of substantially lateral retention openings arranged along a longitudinal axis of said linear projection, the lateral openings being in registration with the receiving means in said base porton, said lead-in wires being bent around said projection after being passed through said receiving means and being termianted and retained in respective ones of said openings in said projection, said bent around portions electrically coupling to said energizing means; and a plurality of optical reflectors mounted on said base portion such that the optical axes of said reflectors are parallel to each other and normal to said row of flash bulbs.

2. Apparatus according to claim 1 wherein said energizing means includes a rotatable drum having a plurality of pairs of spaced contact members thereon, each pair of contact members being adapted to contact the portions of said lead-in wires bent around said linear projection for each respective bulb at successive stages of rotation of said drum to cause energization of said bulbs.

3. Apparatus according to claim 1, wherein said energizing means includes:

a plurality of pairs of spring contact members, each pair corresponding to a pair of lead-in wires for a given bulb and adapted to contact the portions of said lead-in wires bent around said linear projection;

a rotatable drum; and actuating means on said rotatable drum to cause said pairs of spring contact members to contact the bent-over portion of the lead-in wires of the respective bulbs at successive stages of rotation of said drum to cause energization of said respective bulbs.

4. Apparatus according to claim 3, wherein said actuating means includes a plurality of projections at staggered locations on said rotatable drum.

5. A removable flash bulb magazine for use with a plurality of flash bulbs and with an energizing means for successively energizing said flash bulbs, each bulb having at least one lead-in wire, comprising:

an elongated base portion having a plurality of separated receiving means therein which are adapted to receive said flash bulb lead-in wires, said plurality of receiving means being arranged in a row along the longitudinal axis of said elongated base;

a linear projection disposed on the bottom surface of said base portion for coupling to said energizing means, said linear projection having a plurality of substantially lateral retention openings arranged along a longitudinal axis of said linear projection, the lateral openings being in registration with the receiving means in said base portion, said lead-in wires being bent around said projection after being passed through said receiving means and being terminated and retained in respective ones of said openings in said projection, said bent around portions electrically coupling to said energizing means; and a plurality of optical reflectors mounted on said base portion such that the optical axes of said reflectors are parallel to each other and normal to said row of flash bulbs.

6. Apparatus according to claim 5 further comprising a transparent casing mounted on said base portion covering said flash bulbs and reflectors.

7. Apparatus according to claim 5 wherein said plurality of receiving means in said elongated base portion is a plurality of apertures in said elongated base portion.

8. Apparatus according to claim 5 wherein said plurality of receiving means in said elongated base portion is a plurality of notches in said elongated base portion.

References Cited

UNITED STATES PATENTS

| 3,238,749 | 3/1966 | Reiber et al. | 240—1.3 XR |
| 3,327,105 | 6/1967 | Kottler et al. | 240—1.3 |

FOREIGN PATENTS 952,318   3/1964   Great Britain.

NORTON ANSHER, *Primary Examiner.*

RICHARD L. MOSES, *Assistant Examiner.*

U.S. Cl. X.R.

240—37, 37.1